United States Patent [19]

Visser

[11] 4,453,908

[45] Jun. 12, 1984

[54] PELLET MILL VOID SPACE FILLER

[75] Inventor: Odd M. Visser, El Cerrito, Calif.

[73] Assignee: California Pellet Mill Company, San Francisco, Calif.

[21] Appl. No.: 487,261

[22] Filed: Apr. 21, 1983

[51] Int. Cl.³ .............................................. B29F 3/012

[52] U.S. Cl. .................................... 425/331; 100/905; 425/461; 425/DIG. 230

[58] Field of Search ..... 425/331, 467, 382, DIG. 230, 425/463; 100/905

[56] References Cited

U.S. PATENT DOCUMENTS

| | | | |
|---|---|---|---|
| 2,065,141 | 12/1936 | Meakin | 100/905 |
| 2,626,576 | 1/1953 | Meakin | 425/DIG. 230 |
| 2,648,296 | 8/1953 | Oliver | 425/331 |
| 2,958,900 | 11/1960 | Meakin | 100/905 |
| 2,995,096 | 8/1961 | Roskamp | 100/905 |
| 3,010,150 | 11/1961 | Meakin | 100/905 |
| 3,108,055 | 10/1963 | Grant | 425/331 |
| 3,144,840 | 8/1964 | Crane | 425/DIG. 230 |
| 3,166,026 | 1/1965 | Crane | 425/331 |
| 3,327,653 | 6/1967 | Crane | 425/DIG. 230 |
| 3,332,111 | 7/1967 | Häfliger | 425/331 |
| 3,670,516 | 6/1972 | Duron et al. | 100/905 |

FOREIGN PATENT DOCUMENTS

| | | | |
|---|---|---|---|
| 504019 | 6/1951 | Belgium | 100/905 |
| 196947 | 5/1923 | United Kingdom | 100/905 |

*Primary Examiner*—Willard E. Hoag

*Attorney, Agent, or Firm*—Walter C. Vliet

[57] ABSTRACT

An insert for use as a void space filler in a pellet mill die cavity is disclosed. Use of the insert improves die capacity and minimizes blockage.

2 Claims, 3 Drawing Figures

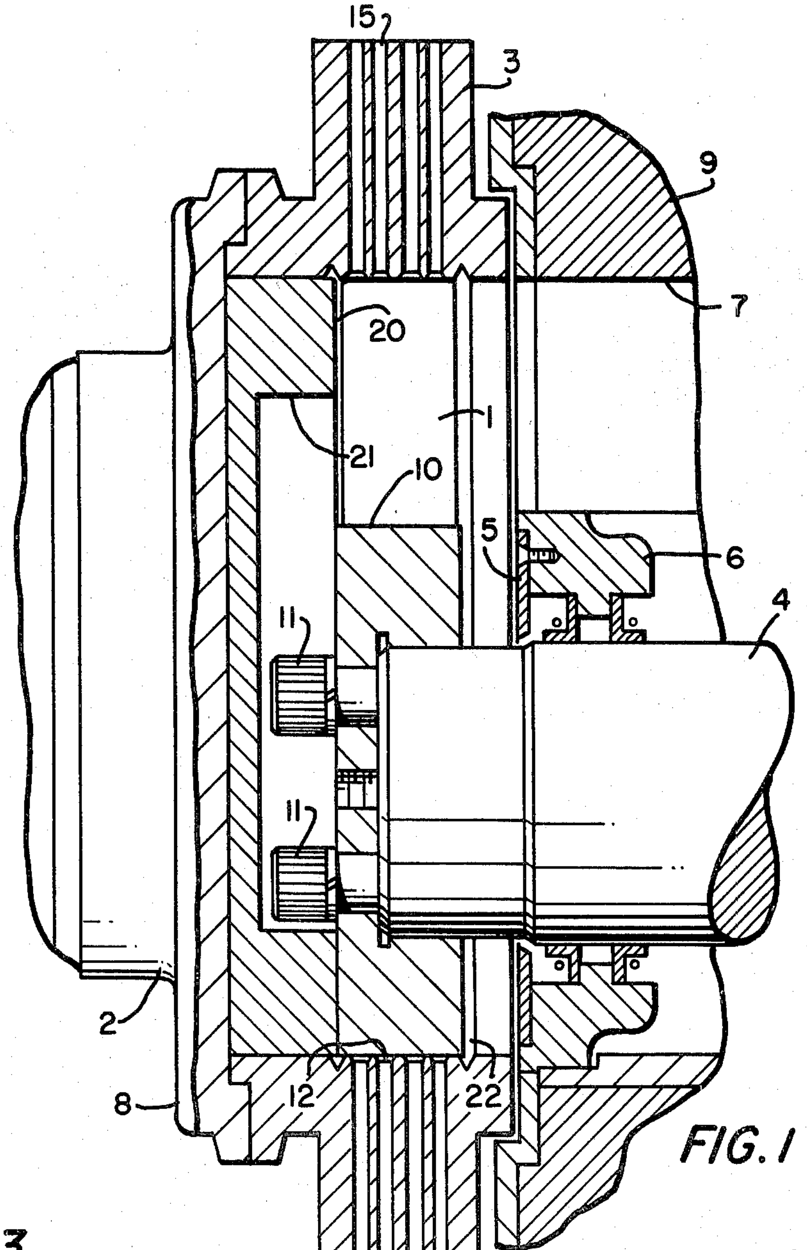
FIG. 1
FIG. 3
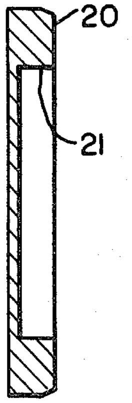
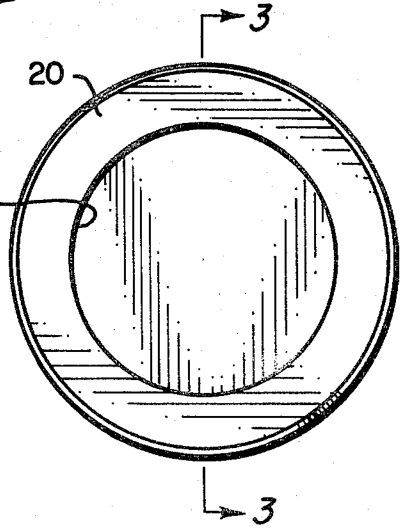
FIG. 2

PELLET MILL VOID SPACE FILLER

BACKGROUND OF THE INVENTION

The function of a pellet mill involves feeding a material to be pelletized into a die cavity where the material is caught in the nip of a roller and a die, where in it is compressed and forced out through holes in the die which form the pellet.

Current designs for pellet mills provide substantial void or free space in the die cavity area. Some void space is necessary and unavoidable to permit feeding of material to the die. Void space may be divided into two categories; active void space which is traversed by the pellet mill roller or rollers and dead void space which is undistributed by the passage of a roller.

It has been found that reduction of dead void space can result in substantial increase or production and operating efficiency.

An object of the present invention is, therefore, to minimize dead void space in the die cavity not necessary for direct introduction of material to be pelletized.

A further object is to provide a removable, low cost, easily manufactured means to reduce the dead void space.

These and other objects are obtained in a pellet mill having a die cavity provided with means disposed in the cavity for reducing the void space of said cavity.

BRIEF DESCRIPTION OF THE DRAWINGS

FIG. 1 is a partially sectioned side elevation view of a pellet mill die cavity having a void filler according to the present invention.

FIG. 2 is a front elevation view of the void filler.

FIG. 3 is a cross section elevation view of the void filler taken at section 3—3 of of FIG. 2.

DESCRIPTION OF THE PREFERRED EMBODIMENT

By way of illustration of my invention, the following preferred embodiment is offered. Referring to FIG. 1, a pellet mill die cavity such as found on a California Pellet Mill Company, Laboratory Pellet Mill (Model CL) is generally shown by reference numeral 1.

The die cavity is formed by a mainshaft 2 and Quill 8 at one end which rotates the die, the die 3 itself about the periphery, and on the opposite end a roller shaft 4 with its associated seal plate 5 and seal assembly 6. A feed inlet 7 also on the opposite side permits entry of material to be pelletized to enter the die cavity through the feed screw bore in the pellet chamber housing.

Shown in the void space are a roller 10 which is secured to the roller shaft 4 by means of cap screws 11. The roller 10 and the die 3 form a nip generally shown at 12. Material caught in the nip is forced into the die holes or apertures 15 and extruded out of the die cavity. The process forms pellets as well known in the art.

Disposed in the die cavity is a void filler 20 which is basically a disc shaped insert having a recess 21 formed in one side to permit passage of the roller mounting cap screws 11. Front and side elevation view of the void filler are shown in FIG. 2 and and FIG. 3 respectively. The void filler closely cooperates with the roller to form a cavity which minimizes escape from the roller path of the material to be pelletized. It is believed that this is responsible for the improvement in capacity and efficiencies experienced. Although I have described my invention in terms of a preferred embodiment for a California Pellet Mill Laboratory Mill, it should be obvious to all skilled in the art that the invention of a void space filler is applicable to other pellet mills and the form of the filler, its location and point of attachment may be varied to accomplish the invention. For example, the design could be incorporated into the die or quill of a pellet mill.

Having described my invention in terms of a preferred embodiment, I do not wish to be limited in the scope of my invention except by the following claims.

I claim:

1. In a pellet mill having a generally cylindrical die provided with apertures therein for extruding material into pellets; at least one roller rotably mounted in a chamber for engagement with said die; a rotatable support for said roller disposed at, and connected to, and end of a roller shaft mounted for rotation along its longitudinal axis; a first closure means at one end of said die; a second closure means at the other end of the die having a feed inlet and passage for said roller shaft therethrough; said cylindrical die, said first closure means and said second closure means forming said chamber; the space between said first closure means and said cylindrical die defining a void space; the improvement comprising a space filler means in said chamber to occupy a substantial part of said void space.

2. A pellet mill according to claim 1 wherein: said space filler means further comprises a disc having a recess facing said rotatable support for said roller, said recess being of sufficient size to permit means attaching said roller to said shaft to rotate therein.

* * * * *